(12) United States Patent
Chen

(10) Patent No.: US 8,503,578 B2
(45) Date of Patent: Aug. 6, 2013

(54) TIME DELAY MEASUREMENT

(75) Inventor: Nongji Chen, Surrey (GB)

(73) Assignee: Mitsubishi Electric Corporation, Tokyo (JP)

( * ) Notice: Subject to any disclaimer, the term of this patent is extended or adjusted under 35 U.S.C. 154(b) by 882 days.

(21) Appl. No.: 12/531,773

(22) PCT Filed: Mar. 27, 2008

(86) PCT No.: PCT/GB2008/001119
§ 371 (c)(1),
(2), (4) Date: Dec. 2, 2009

(87) PCT Pub. No.: WO2008/119972
PCT Pub. Date: Oct. 9, 2008

(65) Prior Publication Data
US 2010/0104048 A1 Apr. 29, 2010

(30) Foreign Application Priority Data
Mar. 30, 2007 (GB) .................................. 0706311.8

(51) Int. Cl.
*H04L 27/06* (2006.01)

(52) U.S. Cl.
USPC ........... 375/340; 375/134; 375/137; 375/145; 375/149; 375/324; 375/328; 375/342; 375/355; 375/364; 375/365; 375/366; 702/79

(58) Field of Classification Search
CPC .... G01S 19/30; H04B 1/7085; H04B 1/7156; H04B 1/713; H04B 1/707; G04F 10/00; H04L 25/067; H04L 7/0331; H04L 7/042; H04J 3/0608; G01R 31/31725
USPC ................. 375/134, 137, 145, 149, 324, 328, 375/340, 342, 360, 364, 365, 366, 355; 702/79
See application file for complete search history.

(56) References Cited

U.S. PATENT DOCUMENTS

| 6,539,320 B1 * | 3/2003 | Szajnowski et al. ............. 702/79 |
| 6,636,558 B1 | 10/2003 | Schnaufer et al. |

(Continued)

FOREIGN PATENT DOCUMENTS

| EP | 1 596 220 | 11/2005 |
| GB | 2 345 149 A | 6/2000 |

(Continued)

OTHER PUBLICATIONS

Office Action issued Nov. 22, 2011 in Japanese Patent Application No. 2009-550322.
Office Action issued Jun. 13, 2011, in Canada Patent Application No. 2,681,604.

(Continued)

*Primary Examiner* — Sophia Vlahos
(74) *Attorney, Agent, or Firm* — Oblon, Spivak, McClelland, Maier & Neustadt, L.L.P.

(57) ABSTRACT

A method of processing first and second corresponding signals having a delay therebetween. The method includes introducing a plurality of different delays between the first and second signals, successive delay amounts differing from each other by less than the interval between chip boundaries, and for each introduced delay, summing samples of the second signal which are obtained at the times of, at least, chip boundaries between bits of the first signal which have the same state, to obtain a value; thereby to obtain a representation of how the value varies according to the introduced delay, which representation contains a level change associated with an introduced delay which bears a predetermined relationship to the delay between the first and second signals.

9 Claims, 8 Drawing Sheets

U.S. PATENT DOCUMENTS

| | | | |
|---|---|---|---|
| 6,744,404 B1 * | 6/2004 | Whitehead et al. | 342/357.61 |
| 7,515,506 B2 * | 4/2009 | Szajnowski | 367/127 |
| 7,616,526 B2 * | 11/2009 | Szajnowski | 367/129 |
| 2006/0280032 A1 | 12/2006 | Szajnowski | |

FOREIGN PATENT DOCUMENTS

| | | |
|---|---|---|
| JP | 2002-533732 | 10/2002 |
| JP | 2003-255045 | 9/2003 |
| JP | 2003-279644 | 10/2003 |
| JP | 2005-326419 | 11/2005 |
| WO | WO 00/39643 | 7/2000 |

OTHER PUBLICATIONS

Office Action issued Apr. 14, 2011, in Korean Patent Application No. 10-2009-7022428.

Office Action issued Aug. 31, 2012 in Canadian Patent Application No. 2,681,604.

Michael D. Zoltowski, et al., "Real-Time Frequency and 2-D Angle Estimation with Sub-Nyquist Spatio-Temporal Sampling", IEEE Transactions on Signal Processing, vol. 42, No. 10, Oct. 1, 1994, pp. 2781-2794.

* cited by examiner

TIME DELAY MEASUREMENT

BACKGROUND OF THE INVENTION

1. Field of the Invention

The invention relates generally to time delay measurement. It is particularly, but not exclusively, applicable to systems that require an accurate measurement of the arrival time of a spread-spectrum radio signal and, in particular, to global navigation satellite system (GNSS) receivers for which the time measurement is essential and ideally should be insensitive to distortions in the received radio signal caused by surrounding reflections (i.e. the multipath phenomenon).

2. Description of the Prior Art

For years spread-spectrum radio signals have been exploited for ranging applications. One well-known example is the global positioning system (GPS) that comprises a number of earth-orbiting satellites that transmit navigational spread-spectrum radio signals. These navigational radio signals are L-band carriers synchronously modulated with satellite-specific, pseudo-random-noise (PRN) code sequences in sync with the GPS system time. This enables a GPS receiver to perform a ranging evaluation to a specific satellite by measuring the time difference between the signal transmission from that satellite and its arrival to the receiver. This time difference is then converted into its equivalent range by multiplying the measured time difference with the speed of light. Working on the triangulation principle, if a minimum of three satellites' ranging values can be established, the receiver can derive its position based on the satellite positions which are embedded in the navigation messages 'piggy-backed' on top of the PRNs that modulate the radio frequency carriers.

To determine the time difference, the GPS receiver aligns a locally generated PRN sequence to that transmitted by the code correspondent satellite. When full alignment is achieved and maintained, the local PRN generation process is regarded as in synchronisation to that of the signal transmitting satellite. Accordingly, the satellite signal transmission time can be inferred from the internal state of the local PRN generation process and the required time difference can be measured in accordance with the local clock within the receiver. Due to cost and size considerations, many GPS receivers make use only of cheap local clock sources that are inevitably far less accurate and stable than the ones residing in the satellites. This reduced accuracy of the local clock, however, can be easily calibrated out by the inclusion of an additional satellite ranging in the receiver position determination procedure. In other words, with a minimum of four-satellite ranging values available, the receiver position and the receiver local clock time offset can be readily established.

The alignment of the locally generated PRN code to that of a transmitted satellite signal in general includes the steps of (a) acquisition of the satellite PRN code and (b) tracking of the code. The acquisition step typically consists of the receiver making a series of correlation measurements, i.e. cross correlating the received modulated signal with locally generated replicas that are separated in time by a single chip or half of a chip of a PRN code sequence. This is commonly referred to as a code phase search operation. If one of the cross correlations reveals a value exceeding a preset threshold, which is typically set above the background noise floor with an operational margin, the search is terminated. The corresponding code phase associated with this search terminating correlation measurement value is the coarse alignment for the locally generated PRN code. After this, the tracking procedure is started. This aims to reduce the possible coarse alignment error of up to a half-chip in magnitude from the acquisition stage to near zero and to maintain phase synchronisation from then on.

The tracking operation generally makes use of a delay lock loop (DLL) for locking the local PRN code phase with that of the incoming signal. The operation of the DLL requires a feedback error signal that indicates the existence and polarity of a non-zero phase difference between the locally generated and the received code sequences. Typically, a pair of early and late correlation measurements is made within the receiver and a subtraction operation between the two correlation measurements is used to form a phase discriminator for producing this feedback signal. Traditionally, the time gap between the locally generated early and late pair of the PRN sequences for making this phase error detection is of one chip in value, but there is an increasing trend of exploiting a 'narrower' time gap to obtain an improved performance, especially when the received signal is distorted by some additional reflections of the same satellite broadcast signal from the surroundings.

Although it is desirable for a GPS receiver to receive only the direct path (i.e. line-of-sight, LoS) signal from each of the navigation satellites in its view, this is hardly practical in many application scenarios. In general and in practical terms, the received signal contains not only the LoS signal from a satellite in the view of a receiver but also a group of multipath signals from the same satellite that travel along different paths and are reflected to the receiver from the surroundings. The multipath signals arrive at the receiver after the direct path signal and combine with the latter to form a distorted version which adversely affects the DLL loop operations, causing possibly a synchronisation offset between the satellite transmission code phase and that of the locally generated code sequence. This synchronisation offset contributes directly to a ranging error in measuring the distance between the satellite and the receiver, leading to the receiver position fix having a deviation from the true receiver position in a typical magnitude of a few to tens of metres.

There are a number of techniques that have been developed to minimise the errors due to multipath effects. A survey and an examination study on these techniques have been published (Elena Simona Lohan, et al., "Highly Efficient Techniques for Mitigating the Effects of Multipath Propagation in DS-CDMA Delay Estimation". IEEE TRANSACTIONS ON WIRELESS COMMUNICATIONS, VOL. 4, NO. 1, JANUARY 2005) in the context of mitigating multipath interferences in DS-CDMA (direct sequence code division multiple access) communications. Focused on GPS receiver applications, U.S. Pat. Nos. 5,809,064, 5,495,499, 5,390,207 and 5,101,416 have discussed the use of narrow early minus late correlators. U.S. Pat. Nos. 5,414,729, 5,692,008, 5,615,232 and R. D. J. Van Nee, J. Siereveld, P. C. Fenton, and B. R. Townsend, "The multipath estimating delay locked loop: Approaching theoretical accuracy limits," in *Proc. IEEE Position Location Navigation Symp.*, vol. 1, 1994, pp. 246-251 have presented a method of estimating a LoS signal propagation time using an array of early and late correlators and this is frequently termed as the MEDLL (Multipath Estimation DLL) algorithm in the literature. The MEDLL method specifically estimates the multipath error contribution by estimating the distortion of the correlation curve at the measured array positions and inferring, through iterations, from the distortion the magnitude and phase of one or more reflected signals.

In a further development, Patent applications WO2004/093339 and CA 2006/02540448 and Patrick C. Fenton and Jason Jones, "The Theory and Performance of NovAtel Inc.'s Vision Correlator", Proceedings of ION GNSS, 2005 Long Beach, Calif., extended the approach adopted in MEDLL to specially arranged correlation measurements that yield an array of correlation accumulations representing a pulse shape instead of the conventional triangular-shaped PRN correlation results. This pulse-shaped correlation variant is called the 'Vision Correlator' in the Fenton et al. publication. Paying particular attention to reducing the sensitivity of the conventional early minus late code phase error discriminator to multipath interferences, a number of patents and patent applications have disclosed special code phase error discriminators with modified correlation arrangements. Examples include: U.S. Pat. No. 6,603,803 (an array of gated correlators are deployed); U.S. Pat. Nos. 5,966,403 and 6,804,927 (several proposed weighting window functions are detailed for suppressing or de-emphasizing the contribution of multipath signals); EP-A-0892277 (a code transitional edge centred special weighting window called blanked-PRN code is used); WO-A-9637789 (exploiting multipath mitigation windows of symmetrical or collectively zero-averaged asymmetrical types); and U.S. Pat. No. 5,808,582 (using narrow 'W-shaped' correlation windows centred at the chip boundaries and the linear combination of sub-classed narrow 'W-shaped' correlation windows). The above different multipath-reduction techniques are all based on the correlation concept and have resulted in varying degrees of success in combating the difficult multipath interference problem for GPS receivers. Still, the challenge remains for solutions with less complexity, for dealing with constrained input signal bandwidth (narrow bandwidth receivers), and better performance, in particular when there are close-in reflected signals (i.e. short delays on the scale of up to few tens nanoseconds in the case of GPS C/A PRN codes).

In a markedly different approach to the conventional correlation concept, U.S. Pat. No. 6,539,320 discloses a technique, referred herein as crosslation, for determining the delay between a primary reference signal and its time-delayed replica. The method is robust and relatively easy to implement in hardware. It has been proposed in patent application EP-A-1596220 to provide a system which is better suited to applications in which the obstacle-detection system should provide high resolution capability for distinguishing closely spaced multiple obstacles. Further aspects of using crosslation in handling pseudo-binary waveforms are proposed in International Patent Application No. PCT/GB06/003944, filed 23 Oct. 2006, in a context of detecting radio signal reflecting objects.

SUMMARY OF THE INVENTION

Aspects of the present invention are set out in the accompanying claims.

According to one aspect, there is provided a method of processing first and second corresponding signals having a delay therebetween, at least the first signal being an irregular binary signal having chip boundaries, the method comprising summing samples of the second signal which are each obtained substantially at a predetermined delay time relative to the time of a respective chip boundary which lies between bits of the first signal which have the same state, to obtain a value; and repeating the sampling to obtain other values for different predetermined delay times which differ from each other by less than the interval between chip boundaries to obtain a representation of how the values vary according to the predetermined delay times, which representation contains a level change associated with a delay time which bears a predetermined relationship to the delay between the first and second signals.

When the introduced predetermined delay matches the delay between the signals, the summed samples will produce a value which is determined by the level of the second signal at times corresponding to predetermined types of chip boundaries, and therefore this value will be predictably different form the average level. However, when the introduced predetermined delay is significantly different form the delay between the signals, the samples will be uncorrelated, because the first signal is irregular, and preferably random (which term is used herein to include pseudo-random), and therefore their sum will represent an average value. By examining the representation of the values it is possible to locate changes between an average value and a predetermined different value, or between two predetermined different values, and thus discover the delay between the signals.

Such a technique can be used for measuring the delay between the signals. If the technique involves samples only obtained in response to chip boundaries between bits of the first signal which have the same state, then a representation referred to below as type-b is obtained. This has leading and trailing edges at positions either or both of which can be determined and used to discover the delay between the signals. The leading and trailing edges are widely separated, which can be advantageous in some systems to mitigate the problems which can arise in detecting the edges due to noise and bandwidth limitations.

If the technique involves samples obtained in response to chip boundaries between bits of the first signal which have the same state, and also in response to chip boundaries between different states, then a representation referred to below as type-c is obtained. This has closer, but substantially higher, leading and trailing edges at positions, thus enabling time delay determination which is less affected by noise than when using a type-b representation.

In both cases, enhancement of the edges can be obtained by deriving values which are not simply obtained by summing samples, but instead by summing the differences between time-separated samples, thereby effectively performing a differentiation. Thus, for example, each selected chip boundary can cause two time-separated samples to be derived, and the difference therebetween to be added to values accumulated in response to previous chip boundaries. Alternatively, the samples obtained for each introduced delay can be subtracted from the samples from the next introduced delay. As a further alternative, the second signal can be differentiated before sampling.

If the above-described techniques were to be modified by using only chip boundaries between bit of opposite state, then a representation referred to below as type-a is obtained. This is similar to the representation which can be obtained using previously proposed techniques such as described in International Patent Application No. PCT/GB06/003944, filed 23 Oct. 2006 (see FIGS. 15a and b). Although such representations are useful, the type-b and type-c representations avoid certain problems of the type-a representation, such as the presence of an early negative side lobe.

The invention can be used to advantage for processing of signals in GPS and other similar positioning systems, for example for tracking loop phase error discriminator for DLL code alignment or LoS signal timing recovery from multipath contamination.

BRIEF DESCRIPTION OF THE DRAWINGS

Arrangements embodying the invention will now be described by way of example with reference to the accompanying drawings, in which.

DETAILED DESCRIPTION OF THE PREFERRED EMBODIMENTS

The invention will be described in the context of the processing of incoming GPS navigation signals and making a signal arrival time measurement of the LoS signal. However, many alternative implementations are possible.

Figure 1:
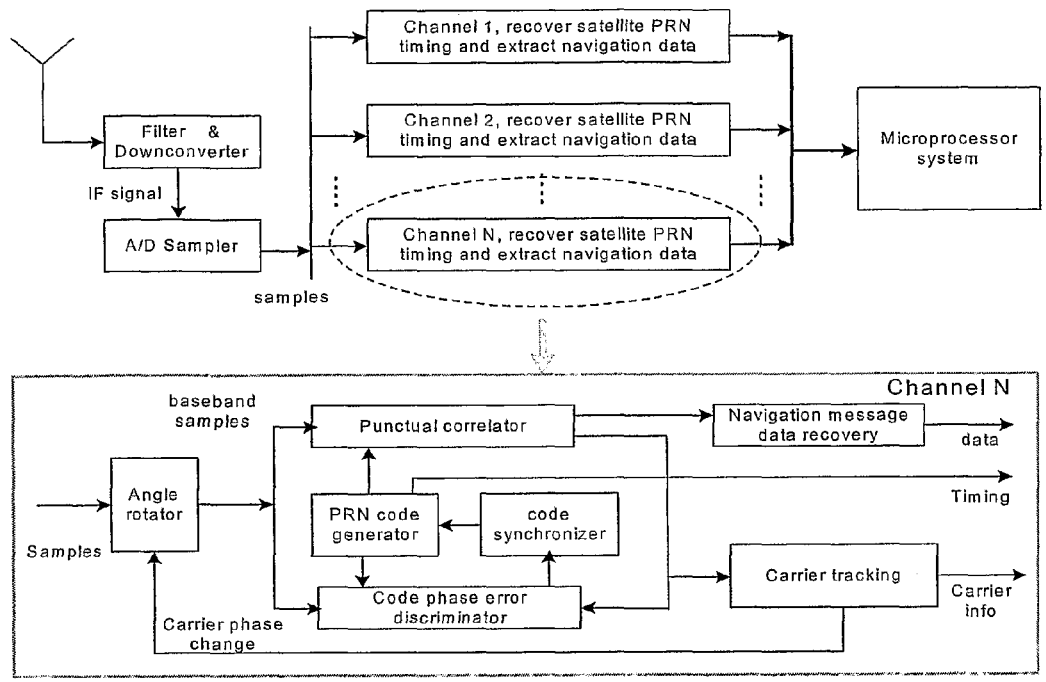
FIG. 1 is a block diagram of a typical prior art GPS receiver structure.

FIG. 1 is a simplified block diagram illustrating a typical prior art receiver structure of a GPS receiver for processing the incoming signal. Here, the PRN code type is assumed to be of the public civilian C/A (C/A=coarse access or civilian access) code for simplicity. The core components in the figure, as far as the signal processing aspects are concerned, are the multiple identical channels. Each tracks a given satellite by configuring the PRN code generator to produce the code sequence corresponding to that given satellite. As shown in the figure, the received radio frequency signal is sampled after down-conversion and the samples are fed to multiple channels for independent channelized processing, which is possible due to the orthogonal property between the PRN codes used in the GPS system.

Figure 2:
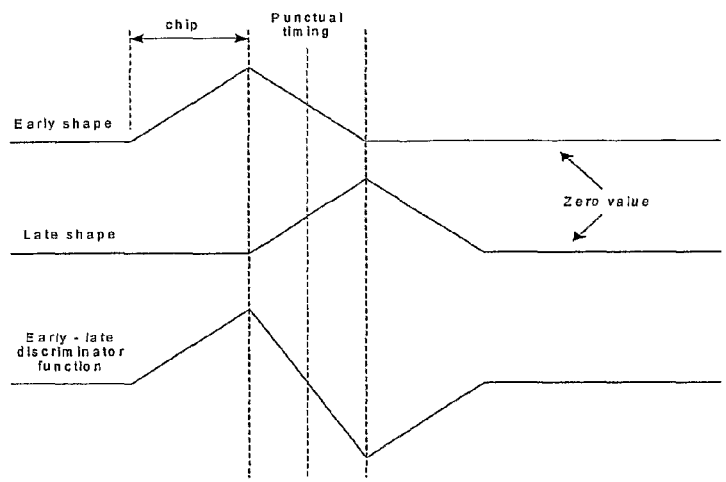
FIG. 2 shows a one chip gapped early minus late correlation discriminator function.

There are essentially two closed loops in each of the receiver channels: one is for tracking the PRN code while the other is for tracking the downconverted carrier phase. The carrier tracking typically exploits a Costas phase locking loop (PLL) structure, in which a punctual correlator's output is used to derive an arctangent-type phase error signal to drive the loop (the word 'punctual' here means that the used code is aligned exactly to the reference time of the PRN generator rather than having an intentional offset). For the code-tracking loop, a code phase error discriminator is used to produce an alignment drive signal that aims to bring the local PRN generator in synchronisation with that of the incoming satellite signal, typically through a DLL arrangement. Traditionally, this discriminator is formed of an early-minus-late correlator pair with a time gap between the locally generated code and the received code of one chip, i.e. the locally generated codes used for the early correlator and those for the late correlator are intentionally shifted to be a half-chip early and half a chip late with respect to the PRN generator's reference time. The discriminator function thus obtained has the shape shown in FIG. 2. When the incoming signal's timing falls within the pull-in region of the central slope in FIG. 2, which has a width in time of one-chip, the DLL loop should be able to bring the local PRN generator in synchronisation with the incoming signal. The loop's stable equilibrium point is at the zero value point of the central slope, which has the effect of forcing the phase of the PRN generator to coincide with that of the incoming satellite signal when no multipath signals are present.

Figure 3:
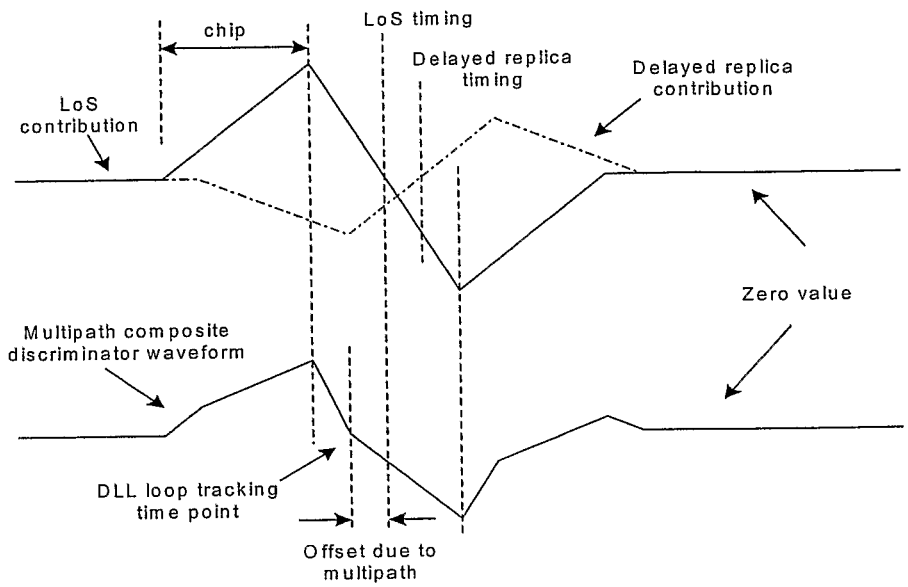
FIG. 3 is an example showing how multipath interference causes tracking offset.

If the incoming signal contains multiple replicas from the satellite that the receiver channel is trying to track, each of the replicas will contribute to the early-minus-late discriminator output, resulting in a composite functional waveform acting on the DLL loop. FIG. 3 shows an example of a composite functional waveform of the superposition of a LoS signal discriminator function and that of a delayed and scaled (including polarity) reflected signal. Clearly, the DLL loop operation's equilibrium zero value point in the composite waveform has been shifted away from that corresponding to the LoS signal's timing point. As a result, the tracking loop produces a static offset error for the locally generated PRN code sequence for as long as the multipath condition remains unchanged.

There are three approaches that can be exploited within a GPS receiver to minimise the adverse effects brought about with the multipath phenomenon:

Design and make use of an improved code phase error discriminator that is relatively insensitive to the multipath replicas in the DLL loop. The aim is to eliminate the tracking offset, if possible, or to limit the tracking offset to a small scale within the DLL mechanism so that the resulted ranging measurement error is kept at a small level given the circumstances;

Estimating the effects and compensating for the multipath-induced ranging errors resulting from the DLL tracking time offset. Essentially, this approach deals with the timing offset issue independently from and outside the DLL loop and the estimation can be done in general less frequently than DLL loop control updates due to the fact that the ranging measurement interval is far longer;

Combination of the above two approaches.

The essential technique disclosed in this invention can be applied to each of the above-mentioned approaches.

Figure 4:
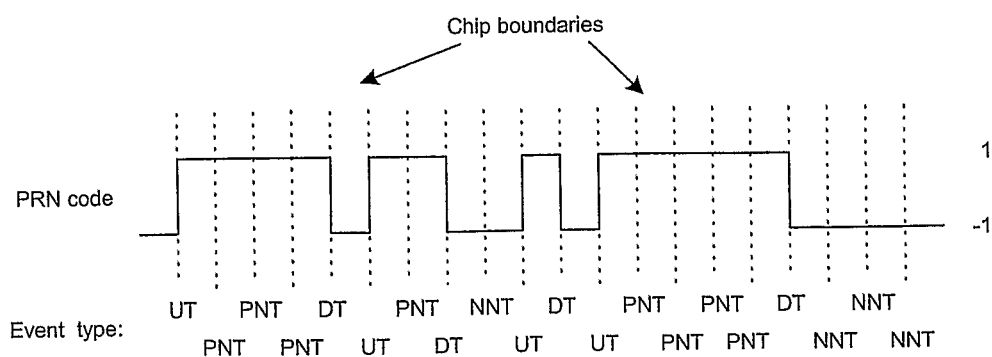
FIG. 4 is a chip boundary event type illustration for a PRN code.

The technique involves event-driven signal extraction and accumulation within an observation window. In the specific examples described herein, the events of concern are the local PRN generator's chip boundaries. These are further grouped into sub-categories of up-transition (UT), down-transition (DT), positive-no-transition (PNT) and negative-no-transition (NNT) events, depending on the chip value and whether a swing of the value occurs at the corresponding chip boundaries of the PRN code. See FIG. 4.

Figure 12:
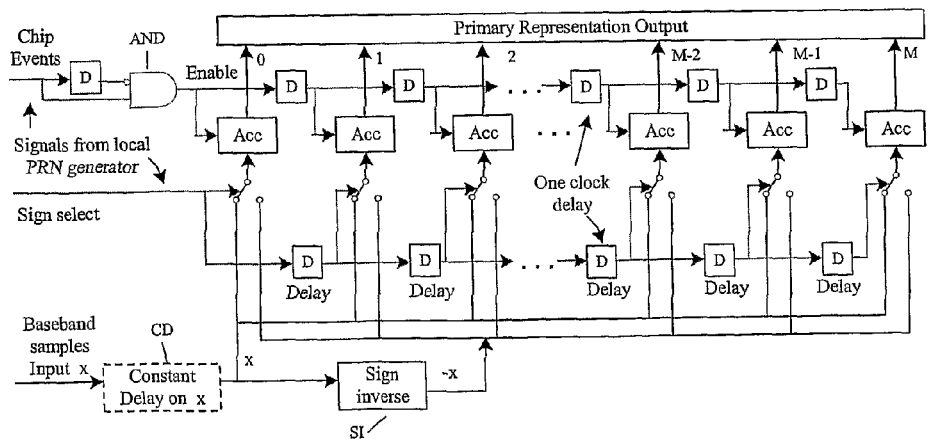
FIG. 12 illustrates a primary-output signal processor which can be used in embodiments of the invention.

FIG. 12 illustrates a signal processor which can use techniques according to the present invention to enable time delay measurement in response to the events in the local PRN code. The principle of operation of the processor of FIG. 12 will be described with reference to FIG. 13.

Figure 13:
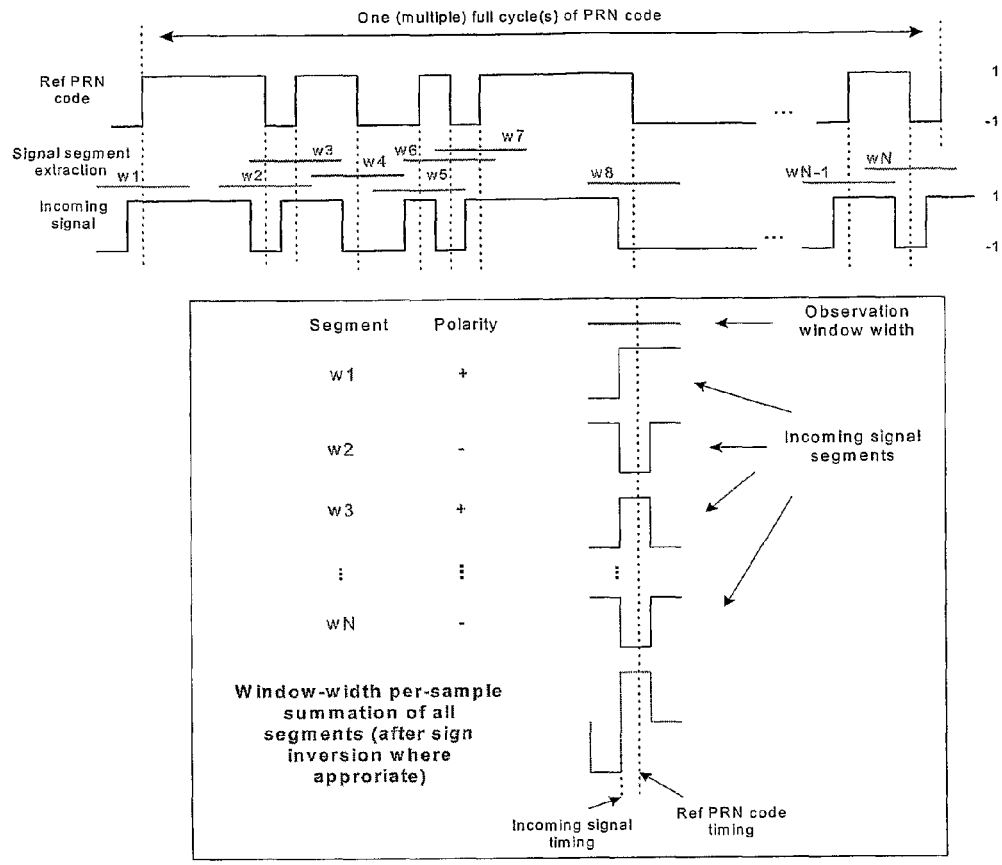
FIG. 13 is a diagram illustrating the operation of the processor of FIG. 12.

An exemplary reference PRN code generated by the local code generator is shown at the top of FIG. 13. Below this is shown the PRN code extracted from the received signal, which has an unknown time delay relative to the reference PRN code. The received PRN signal is sampled in response to events corresponding to chip boundaries in the local reference PRN code, after (where appropriate) eliminating events of certain types. Each selected event in the local PRN code causes multiple, mutually-delayed samples to be taken of the incoming PRN signal.

FIG. 13 shows an example in which only up-transition (UT) and down-transition (DT) events are used. As shown in the upper part of FIG. 13, each such event triggers the taking of multiple samples of the incoming signal throughout a respective time window. The window width is preferably equal to or greater than twice the interval chip boundaries. Thus, preferably, windows for adjacent chip boundaries will overlap. For a bandwidth of 8 MHz, samples are preferably taken at a rate of 16 MHz, so that if the interval between chip boundaries is about 1 μS, there will be at least around 10-20 samples in the interval between adjacent chip boundaries.

The time windows are shown at w1, w2, wN. The samples within each of these windows are taken at different delay times relative to a respective chip boundary. The samples taken at a particular relative delay time are summed with the corresponding samples in the other windows, assuming the other windows correspond with events of the same type. The cumulative values of the samples triggered by the DT events are subtracted from the cumulative values of the samples triggered by the UT events. The lower part of FIG. 13 shows, for each of a number of windows, a representation of the sample values within that window, together with representation of the final cumulative sum of the sample values in all the windows.

In the example shown in FIG. 13, because the sampling is done in response to detected transitions in the local PRN code, the final representation formed by summing the samples exhibits a transition between extreme values at a position (relative to the event timings in the local PRN code) which represents the delay between the local PRN code signal and the incoming PRN signal.

FIG. 12 shows an implementation of a processor for performing the sampling and combining operations. The previously defined crosslation PRN chip events (UT, DT, PNT and NNT) can be essentially regarded as consisting of an event timing and a sign indication. These are generated locally within the receiver with regard to the local PRN generator reference time. The processor comprises an array of accumulators Acc and various delay elements D, each of which delays a received signal by an amount corresponding to the intervals between the baseband input sample clocks. The control signals for the processor are also synchronised with the sample clock.

Each selected chip event is delivered to one input of an AND gate and, via a delay D, to an inverted input of the AND gate. The output of the AND gate thus produces an enable pulse for each selected chip event.

Baseband samples of the input signal (x) are delayed by constant delay circuit CD for delivery to the accumulators Acc. The delayed samples are also inverted by a sign inverse block SI, so that the inverted samples can alternatively be delivered to the accumulators Acc.

The arrangement is such that each chip event generates an enable pulse which causes the first accumulator in the array to sample either the input signal x or its inverse, depending upon the type of event as represented by the sign select signal delivered to a switch at the input of the accumulator.

The same operation is carried out by the next accumulator after a delay time caused by delay circuits D receiving the enable pulse and sign select signal. The operation is then repeated following further delays by the rest of the accumulators. Accordingly, each chip event triggers the acquisition of multiple samples (at different delays relative to the chip event) throughout a window period. Each accumulator Acc accumulates the incoming signal samples and the results of the array of accumulators Acc form the output at the end of the accumulation time period; then the accumulators undergo a clear to zero action, preparing for a new 'accumulate and dump' work cycle.

The 'constant delay' component in the figure is used in consideration of a design alignment issue. Its role is to shift the local PRN generator timing to a designated position in the processor observation window. It should also be pointed out that, since the events input in FIG. 12 is synchronised to the baseband sample clock, the sample timings are approximate to the true PRN chip timings with possible delays of up to one sample clock. This is because, in general, the PRN chip clock is asynchronous to the sample clock. With a large number of such late-inclined approximations in an accumulation cycle, the statistical net effect on the crosslation results is that the PRN chip timing position is shifted 0.5 sample-gap earlier in the observation window, and this should be taken into account to obtain a more accurate result.

The 'enable' signal in FIG. 12 becomes valid for one sample clock period when a chip event appears. It works in conjunction with the 'sign select' signal to effect an accumulation with either an addition or a subtraction. The delay elements realise the function of extracting input signals in a region of interest.

Figure 5:
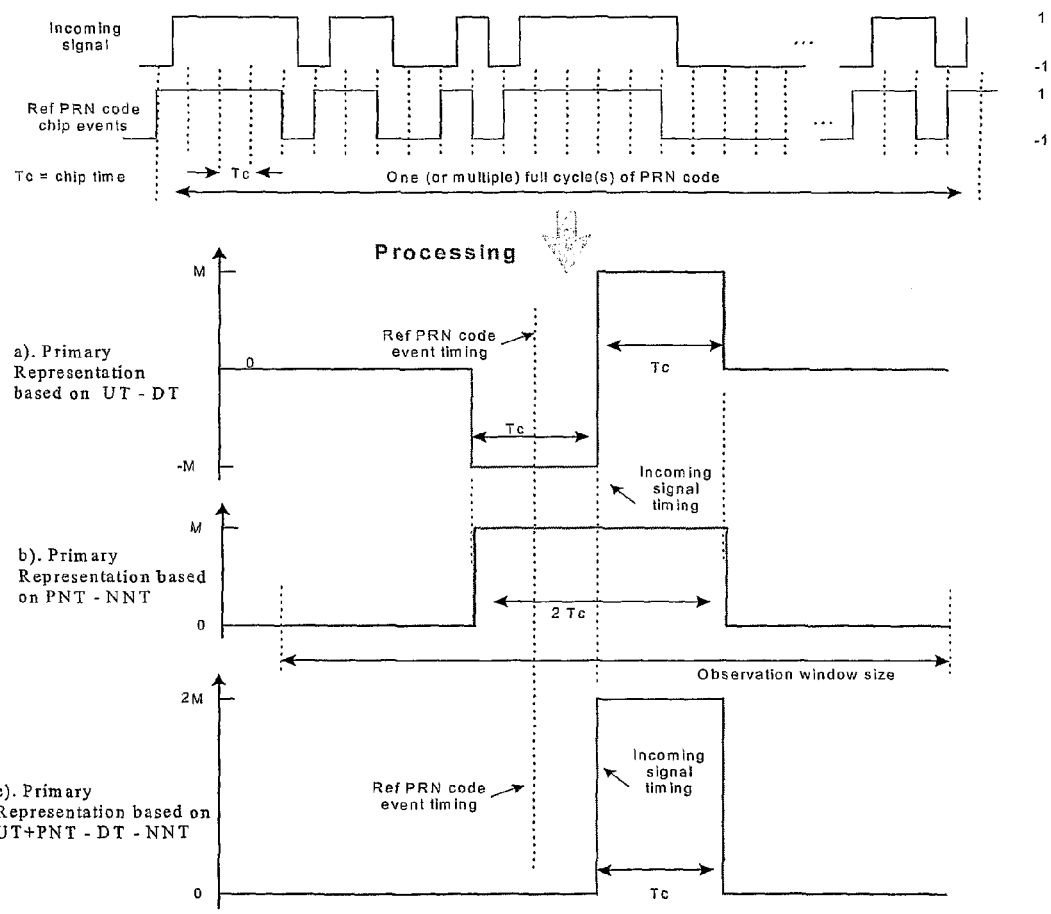
FIG. 5 shows primary output functions when using different combinations of the PRN chip events.

FIG. 5 illustrates the characteristic processor output results on a single PRN code sequence (i.e. no multipath replicas), assuming an ideal infinite incoming signal bandwidth and an appropriate observation window size.

Three output waveforms are shown in the figure, each obtained with a different selection of the PRN code chip events. Specifically, case a) in the figure corresponds to the example of FIG. 13 and is obtained with the accumulations being carried out on the incoming signal when an up-transition (accumulated with an addition) or a down-transition (accumulated with a subtraction) event occurs with the local generated PRN code sequence (marked as 'Ref PRN code' in the figure) and the accumulation formula is symbolised as (UT−DT); case b) corresponds to a similar accumulation procedure but only using PNT and NNT events (symbolised as (PNT−NNT) for the formula in the figure); finally, case c) is a combination of the earlier two cases with all events being used and with the specific accumulation formula symbolised as UT+PNT−DT−PNT, i.e. effectively the sum of the waveforms in a) and b). For convenience, these three different cases are alternatively referred to here as type-a, type-b and type-c representations, respectively.

The length of the accumulator array elements defines the size of the observation window for the realised processor. The exact size is task dependent and should be long enough to avoid features of interest dropping out of the scope. For some cases, it is possible to have longer gaps than a single sample in anticipated regions of less intense interest, such as the zero regions as well as the mid of the top region of the square waves shown in FIG. 5.

Figure 6:
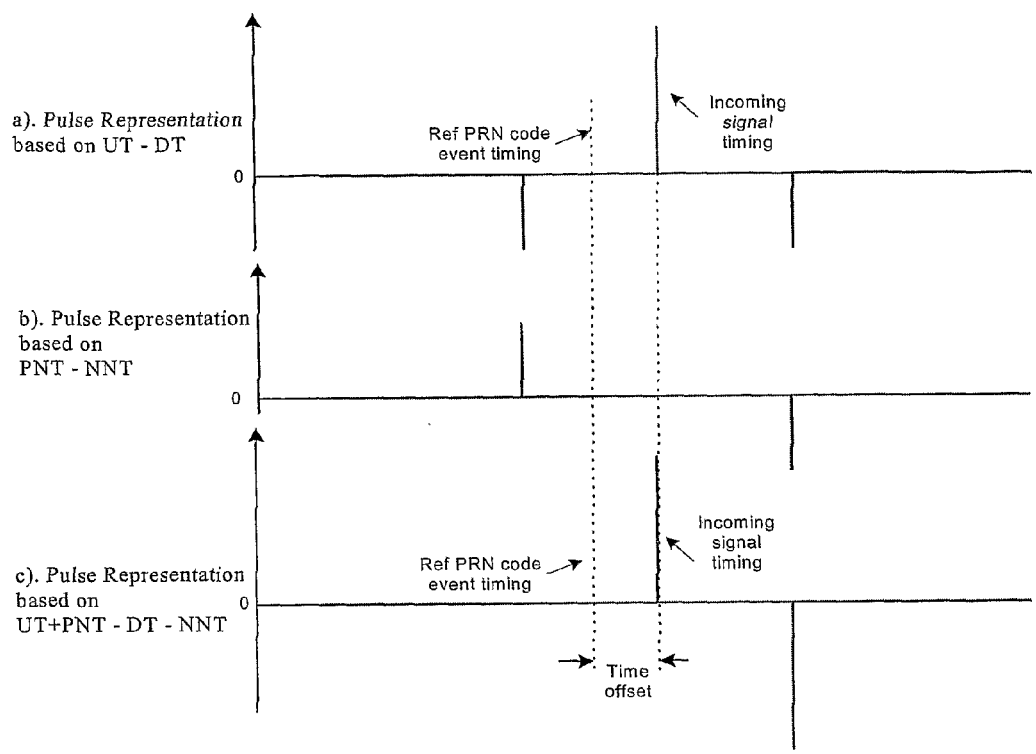
FIG. 6 shows pulse output functions when using different combinations of the PRN chip events.

Although the events used for the sample acquisition are based on the locally generated PRN code, the incoming signal containing the same sequence is manifested in the output representations by positive going or negative going edges that have a fixed offset with respect to one another. Therefore, the derivatives of the representations will always have dominant components in the form of Dirac delta functions that indicate the relative timing of the incoming PRN signal sequences, as illustrated in FIG. 6. When multipath components are present in the incoming signal, the resulting output representations are the superposition of the scaled and delayed corresponding individual component output functions. For convenience, we shall refer the representations in FIG. 5 as the primary representations and their derivative shapes in FIG. 6 as pulse representations.

It is noted that case c) of the pulse representation in FIG. 6 provides the same timing indication pulse as that of case a) but does not have the early side lobe of the latter. This is advantageous in two aspects in resolving the LoS signal detection problem. Firstly, it makes the detection issue simpler since the earliest above noise level signal pulse will be the LoS signal irrespective of whether or not the power of the LoS signal is higher than that of its delayed multipath replicas. Second, it reduces the number of potential interferers to the LoS timing pulse, because those received replicas happening to be delayed around one-chip with respect to the LoS signal are now contributing essentially zero-energy at the timing point (an issue of practical interest as receivers always have a limited bandwidth for the incoming signal). Compared to case c), case b) in the figure can equivalently be considered as having no earlier side lobes but is less preferred in general since the pulse magnitude is only half of that of the former and hence more susceptible to noise. However, because of the wider gap between the timing signalling pulse (the left one) and its corresponding later (right) pulse, it is an option for consideration for use in narrow-band low-cost receivers, in which the energy in these pulses is spread out over time. The wide distribution of the leading and trailing edges can aid in edge detection. The time delay can be determined from the position of either, or both, edges.

Figure 14:
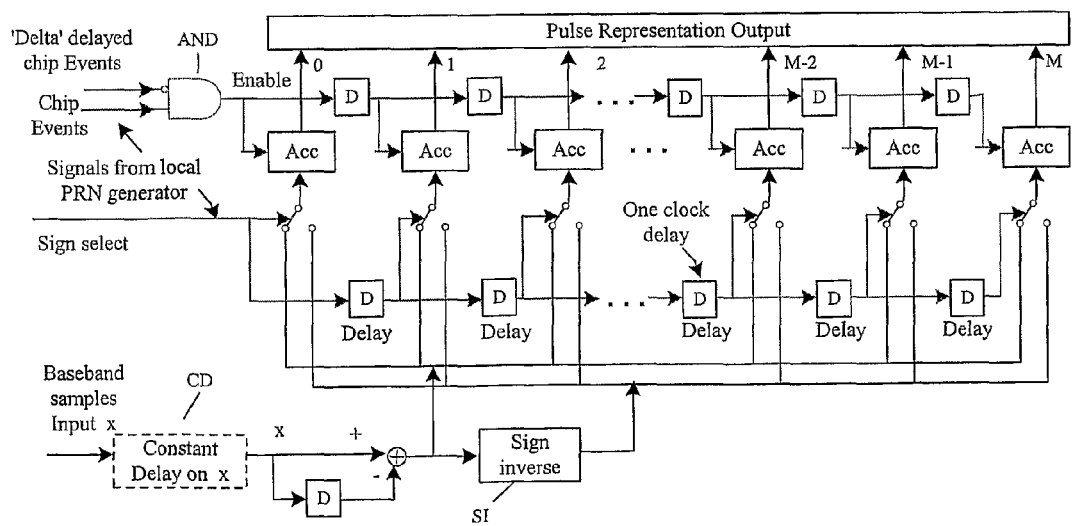
FIG. 14 illustrates a pulse-output signal processor which can be used in embodiments of the invention.

If it is desired to use a pulse representation, this can either be obtained as a post processing of the primary representation by applying a difference operator, or can be obtained directly by using a processor such as that shown in FIG. 14 in place of the one shown in FIG. 12. The arrangement shown in FIG. 14 is essentially identical to that of FIG. 12, except that the samples of input signal x are applied to a positive input of a subtractor SB, and via a delay circuit D to a negative input, so that the output of the subtractor effectively produces the differential of the input samples. The accumulators thus receive the derivatives of the input samples (or their sign inverse), rather than the samples themselves.

The events input contains the 'normal' timing branch as well as those from a 'delta' delayed version of it. The arrangement is the same as in FIG. 12, except that, preferably the value of the 'delta' delay applied to the signal received by the inverted input of the AND gate is less or equal to the baseband sample clock period. Conceptually, with a narrower 'delta' value, the pulse representation would approach the ideal derivative of the primary representation better. This, however, is counterbalanced in practice by the fact that the narrower the 'delta' is, the fewer the actual unsynchronised PRN generator chip timing events will fall in between the two synchronised chip (approximated) events which controls the enable signal of the accumulators in FIG. 14. This in turn may cause some adverse statistical variation in pinning down the corresponding PRN chip timing position in the pulse crosslation observation window. Therefore, a sensible compromise between the 'delta' time gap and that of the sampling rate is required in a practical realisation. Alternatively, interpolation filters can be exploited to boost the data rate of the input signal entering the processors for narrow 'delta' gap cases.

Other arrangements are possible. For example, a pulse representation could instead be obtained by:
i) using, instead of a single enable pulse, a pair of closely-spaced enable pulses, and arranging for the sign select signal to become inverted in between enable pulses of each pair. Thus, each chip event will result in each accumulator receiving a first sample, followed by a slightly time-delayed and inverted second sample, of the input signal x. Therefore, the accumulator will effectively be accumulating the differential of the input signal. Or
ii) the output of each accumulator can be subtracted from the output of the adjacent accumulator, thus effectively differentiating a primary representation to obtain a pulse representation.

Whichever technique is used, the pulse representation comprises a succession of values each representing the sum of the differences between first and second samples triggered by a particular type of selected event, combined with corresponding sums for each other type of selected event (if any).

As will be described, the processor of FIG. 12 and/or the processor of FIG. 14 can be used for time delay measurement, for example in a GPS receiver. In either case, the output representation is examined to determine the location (i.e. the relative delay) of a level change which represents a combination of events in the received signal, this being indicative of the delay between the local and received signals.

Preferably, the type-c pulse crosslation function is used to estimate the LoS signal timing through an earliest pulse peak position detection algorithm. This can be conveniently carried out through a left-to-right search for an earliest above noise level peak position in the pulse crosslation output. Since the energy concentration of the filter impulse response is sharply centred at the timing point in comparison to conventional correlation techniques, the adverse effect of multipath signals is significantly minimised and is constrained only to components of very close-in delayed signal replicas.

However, accurate time delay measurement will involve detecting the precise position of an edge, in the case of a primary representation, or a spike in the case of a pulse representation.

Figure 7:
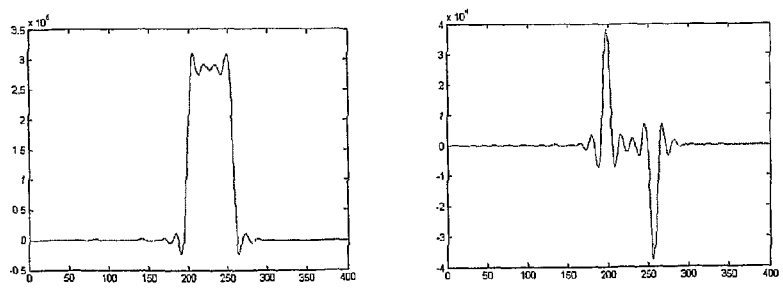
FIG. 7 shows the effects of signal bandwidth on output functions, based on the PRN chip events.

The signal bandwidth of a receiver is invariably limited in practical systems. Assuming an 8-MHz input signal bandwidth, FIG. 7 shows the crosslation results on GPS PRN-1 code sequence, which in fact is the equivalent result of the convolution between the impulse response of the bandwidth-limiting filter and the corresponding crosslation functions of the infinite bandwidth PRN signal. For simplicity, only the type-c representations are included in the figure. Comparing the figure to that of infinite input signal bandwidth in FIGS. 5c) and 6c), it is apparent that the receiver filter has played a significant role in shaping the crosslation output functions. The ringing effects and the sloped edges in the primary crosslation function make it less convenient to work with than its pulse-shaped equivalent in determining the incoming signal's timing spot. Further, the existence of the bandwidth-limiting filter might cause the leading edge slope or LoS signal pulse of the crosslation functions to be affected by some close-in multipath replicas when present. This makes it desirable to have a method to recover the LoS timing when the pulse shape is 'skewed' due to some close-in multipath signals.

In order to mitigate this problem of multipath interference from close-in delayed signal replicas, a localised fitting algorithm is preferably used to recover the LoS pulse peak timing spot from the representation in which the earliest pulse shape may have been skewed due to the existence of the multipath signal replicas.

For simplicity, it will be assumed that the impulse response of the signal bandwidth-limiting filter in baseband is symmetrical, which normally would be the case in practice. Extending the algorithm to cover asymmetrical filter impulse response is possible but the dimension of the fitting parameter vector would need to be increased.

Denoting the bandwidth-limiting filter impulse response as f(t); where f(t) is even symmetrical to its centre t=0. Then the type-c pulse representation can, from superposition, be described as $$X(t) = \sum_{i=0}^{m-1} [a_i f(t - \tau_i) - a_i f(t - \tau_i - T_c)] + n(t), m \geq 1 \quad (1)$$

Where m is the number of received signals, including both the LoS signal and its delayed replicas, n(t) the noise term in the representation, Tc the PRN code chip duration, $a_i$ the amplitude attenuation of the i-th component and $\tau_i$ its corresponding timing. It is assumed that the receiver has knowledge of the effective filter impulse response f(t), either in the form of a pre-stored table or its analytical formula. This could be established in practice through analysis of the design or by undertaking a calibration measurement.

The fundamental idea of the disclosed algorithm is to perform a region of interest curve fitting around the earliest peak position of the receiver crosslation output with a three-path model instead of a full range of components decomposition, as described below. The benefit of such an approach is that it has the potential to avoid the generally difficult, computationally ill-defined and costly problem of obtaining a precise de-convolution solution to the right side of equation (1), which contains in general an unknown number of components. Such a simplification is possible because, for GPS and other time of flight detection applications, only the timing information of the LoS signal is required.

Denoting the parameters of the three-path model in a vector form:

$$\xi = [\tau_0, \tau_1, \tau_2, a_0, a_1, a_2]^T, \tau_0 < \tau_1 < \tau_2 \quad (2)$$

The LoS timing estimate $\hat{\tau}_0$ can then be extracted from the localised fitting based on:

$$\hat{\tau}_0(\hat{\xi}) = \underset{\xi}{\text{Min}} \int_{t_p - R_l}^{t_p + R_h} w(t - t_p) \left[ X(t) - \sum_{i=0}^{2} a_i f(t - \tau_i) \right]^2 dt \quad (3)$$

In (3), the interval $[t_p - R_l, t_p + R_h]$ defines the fitting region around the earliest peak position $t_p$. It can either be symmetrical by setting $R_1 = R_h$ or asymmetrical by selecting different values. The size of the region in general should be between 1~1.4 times the reciprocal of the incoming signal's bandwidth, i.e. approximately 50%~70% of the impulse function main lobe's zero-to-zero width. The weighting function w(t) is included to fine tune the emphasis during the fitting process, typically in the vicinity of the peak position, but it can simply be set to 1. The term $$\sum_{i=0}^{2} a_i f(t - \tau_i)$$

in equation (3) represents a three-path model approximation of the pulse crosslation output expressed in (1) for the interval $[t_p - R_1, t_p + R_h]$. Note the late side lobes are ignored in the model as the contributions from them are essentially zero in the vicinity of the LoS timing position due to the at least near one-chip delay and the generally sharp pulse energy concentration of the impulse function f(t).

The minimisation process in (3) implies a six-dimensional optimisation. This can be simplified to a three-dimensional search in vector space $[\tau_0, \tau_1, \tau_2]$ by defining and exploiting a 'skew-function' that enables the determination of the attenuations $(a_0, a_1, a_2)$ to be separately carried out with least square means or other appropriate techniques for a given set of the delay parameters $(\tau_0, \tau_1, \tau_2)$.

The 'skew-function' y(k) is formed by assuming the estimated timing point $\tau_0$ is the true timing point (i.e. at the centre of the main lobe) of the LoS component pulse in the crosslation output X(t) and performing subtractions of X(t) at equal time intervals with respect to the assumed LoS timing $\tau_0$:

$$y(k) = X(\tau_0 - k_\tau) - X(\tau_0 + k_\delta), k=1, 2, \ldots, n; \text{ and } n_\delta \leq \min (R_1, R_h) \quad (4)$$

where δ is the digitisation sampling time interval. Replacing X(t) with its three-path model approximation in the region of interest and denoting a new noise term in u(k), there is $$y(k) \approx \sum_{i=0}^{2} a_i f(\tau_0 - \tau_i - k\delta) - \sum_{i=0}^{2} a_i f(\tau_0 - \tau_i + k\delta) + u(k) \quad (5a)$$

With f(t) being symmetrical, the contribution from the LoS signal is zero, so y(k) is reduced to the skewing terms only (hence the chosen name 'skew-function') caused by the two delayed multipath components:

$$y(k) \approx \sum_{i=1}^{2} a_i [f(\tau_0 - \tau_i - k\delta) - f(\tau_0 - \tau_i + k\delta)] + u(k) \quad (5b)$$

From the 'skew-function' (5b), since the f(t) is known and $(\tau_1, \tau_2)$ are given in the search process, the solution on $(a_1, a_2)$ can be obtained as $$[\hat{a}_1 \ \hat{a}_2]^T = \underset{a_1, a_2}{\text{Min}} \left\{ \sum_{k=1}^{n} \left| y(k) - \sum_{i=1}^{2} a_i (f(\tau_0 - \tau_i - k\delta) - f(\tau_0 - \tau_i + k\delta)) \right|^2 \right\} \quad (6)$$

The solution of this minimisation is straightforward and can be done efficiently using a least squares approach or any other appropriate optimisation techniques. After this, the estimate of $a_0$, conditional on the existing $[\hat{a}_1 \ \hat{a}_2]$ given $(\tau_0, \tau_1, \tau_2)$, can be obtained simply with a linear regression:

$$\hat{a}_0 = \left\{ \sum_{k=-n}^{n} f(k\delta) \left[ X(\tau_0 + k\delta) - \sum_{i=1}^{2} \hat{a}_i f(\tau_0 - \tau_i + k\delta) \right] \right\} / \sum_{k=-n}^{n} f^2(k\delta) \quad (7)$$

Figure 8:
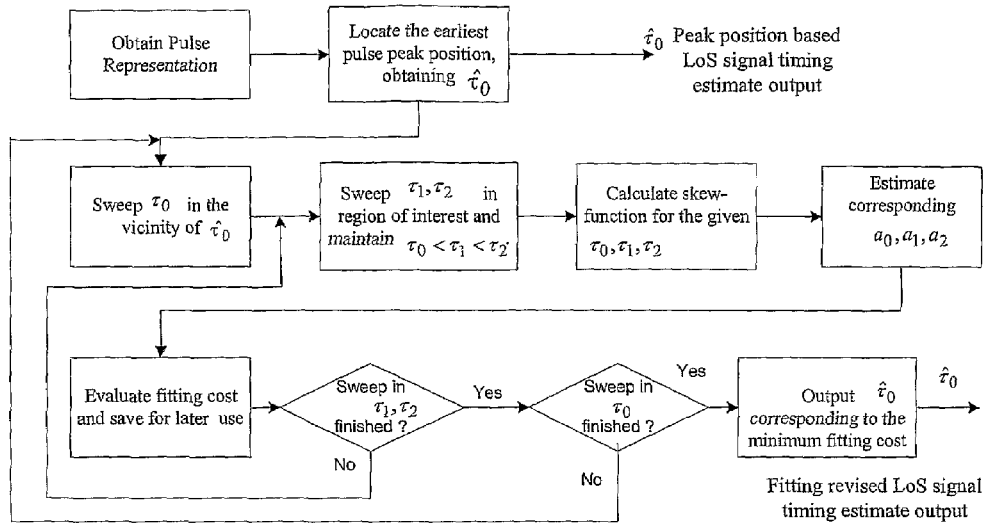
FIG. 8 is a LoS recovery algorithm flow chart.

Exploiting the 'skew-function' concept, FIG. 8 shows the delay-space search operation algorithm as a flow chart. Since multipath interference determination on the LoS signal component in the pulse crosslation output is constrained to the close-in signal replicas of the three path model: $\tau_0 < \tau_1 < \tau_2$, the search space of the algorithm is greatly reduced. This is combined with the benefit that the initial estimate on $\tau_0$ is already accurate and makes the algorithm viable for real-time operation with a moderate computational requirement.

Figure 9:
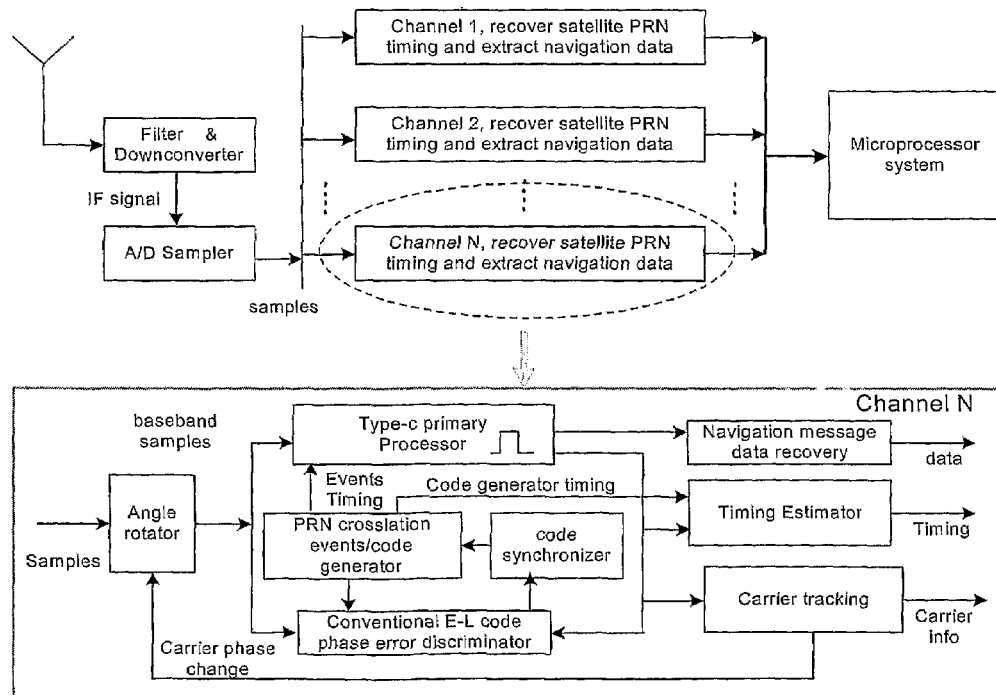
FIG. 9 shows a GPS receiver according to a first embodiment of the invention.

FIG. 9 shows an embodiment of a GPS receiver according to the invention.

For carrier tracking, a processor such as that shown in FIG. 12 is used to generate a type-c representation, from which the delay between the locally generator PRN signal and the received PRN code can be determined from the position of the leading edge of the resultant pulse (see FIG. 5c). The output representing the time delay is applied to the carrier tracking block for tracking the carrier phase. It is also used for deriving, in a per se known manner, the navigation message in the navigation message data recovery block. A Timing Estimator block receives a signal representing the timing of the local PRN code and a further signal, from the type-c primary representation processor representing the delay between the local code and the received PRN code, and from these calculates the required timing signal for the channel. Preferably, the timing estimate is refined by using the curve-fitting procedure described with reference to FIG. 8.

The embodiment retains a conventional early minus late correlator discriminator for the PRN code tracking DLL loop. Consequently, the PRN code generator itself may be at an offset when multipath signal replicas are present. This is mitigated before the timing output by the Timing Estimator block, which takes an input from the type-c event processor and the local PRN reference timing from the PRN code generator. The event processor outputs are also used for data extraction and carrier PLL loop phase tracking. There are multiple options available for deriving the required signals from the event processor outputs for these tasks. Among them, as an example, accumulating the processor output samples corresponding to a time window of one-chip in length, starting from the local reference timing point in the type-c primary representation, will yield an equivalent output signal to that from a conventional punctual correlator—hence the tracking and data extraction can be executed in a similar manner for this example as would be with the conventional punctual correlators.

Figure 10:
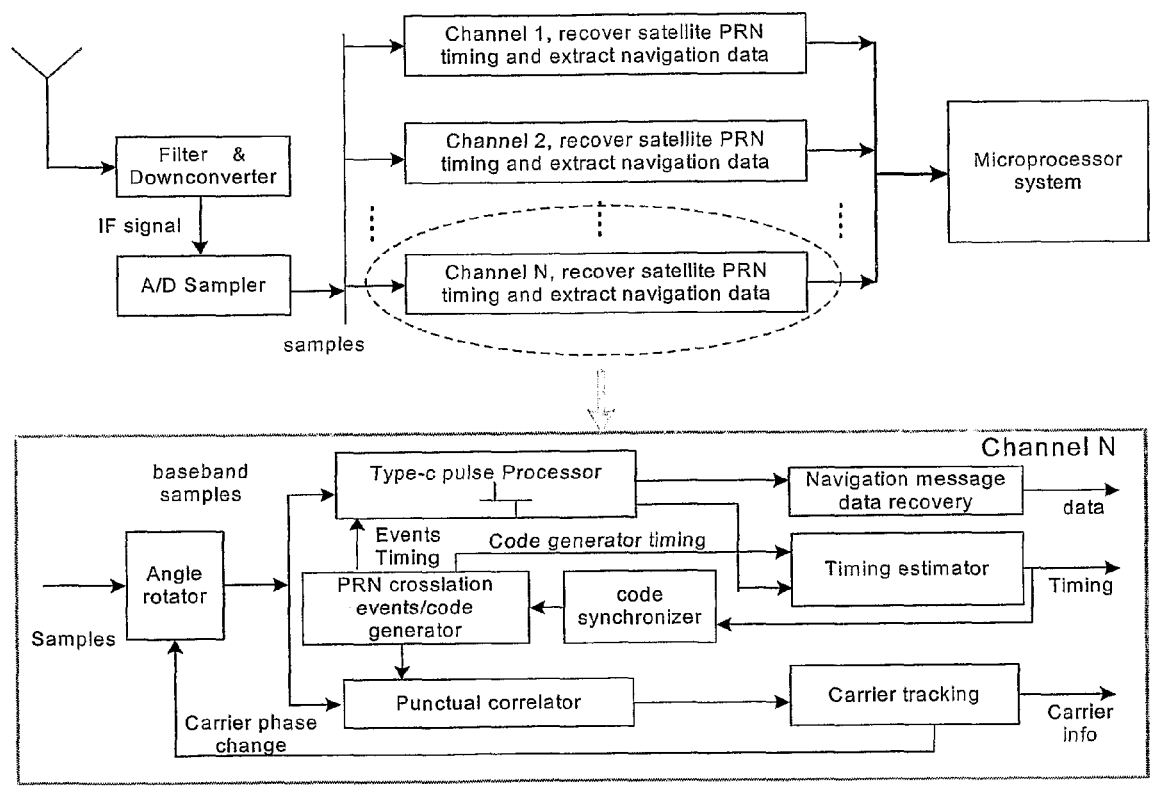
FIG. 10 shows a GPS receiver according to a second embodiment of the invention.

FIG. 10 shows another embodiment in which the type-c representation is used. In this case, carrier tracking is carried out by a conventional punctual correlator, but the timing estimate and the navigation message recovery is performed in response to a delay measurement derived from a type-c pulse representation output, from, for example, a processor such as that shown in FIG. 14.

Figure 11:
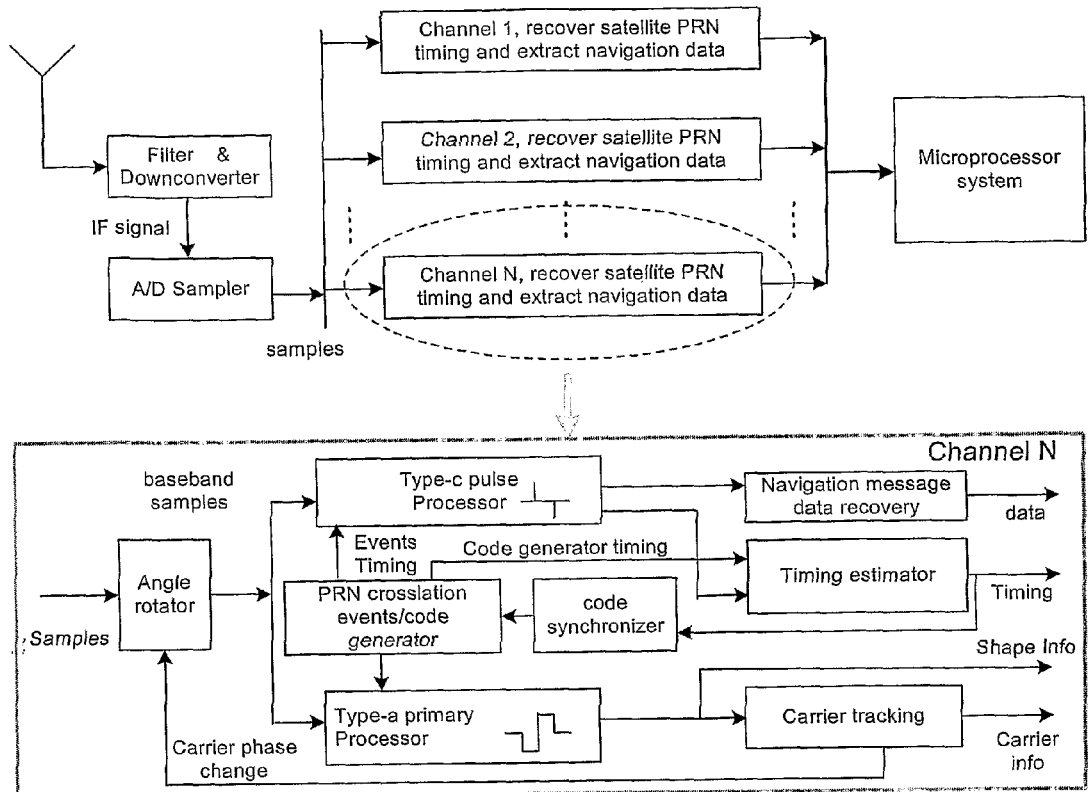
FIG. 11 shows a GPS receiver according to a third embodiment of the invention.

FIG. 11 shows yet another embodiment in which both the type-a and type-c representations are exploited. This is similar to FIG. 10, except that carrier tracking is carried out in response to a type-a primary representation output, from, for example, a processor such as that shown in FIG. 12. It should be noted that the type-a primary provides a convenient means for monitoring the chip shape for detecting malfunctioning of the system. Additionally, the code-loop DLL discriminator and the navigation message data recovery can be arranged to derive their values from the type-a primary representation as an alternative arrangement to the one shown in the figure.

Various modifications are possible. In the described examples, the first (locally generated) and second (received) signals are bipolar for convenience, but this is not essential. Both signals are binary, but this also is not essential. For example, the first signal could be derived by hard-limiting an analogue signal. Thus, although the signals correspond, in that they have trains of events with matching event intervals, they may in other resects differ. The described embodiments operate in a parallel manner, in that separate components are used for respective introduced delays. However, a serial arrangement could be used, in which the same accumulator is used with a variable delay circuit. In the described embodiments, both PNT and NNT chip boundaries are used, because this improves the signal to noise ratio, but it is not essential. Also, in obtaining type-c representations, it is not essential to use both UT and DT boundaries.

The invention claimed is:

1. A method of processing first and second corresponding signals having a delay therebetween, at least the first signal being an irregular binary signal having chip boundaries, the method comprising:
   sampling the second signal to obtain a plurality of values for each of a plurality of different predetermined delay times relative to a respective chip boundary which lies between bits of the first signal which transit different states and/or have the same state, the plurality of different predetermined delay times differing from each other by less than an interval between chip boundaries; and
   summing samples of the second signal which are obtained substantially at each of the plurality of different predetermined delay times relative to the respective chip boundary to obtain a representation of how the plurality of values vary according to the plurality of different predetermined delay times, which contains a level change associated with a delay time which bears a predetermined relationship to the delay between the first and second signals, wherein
   the samples are obtained only in response to chip boundaries between bits of the same state, and
   the representation includes a sum of samples obtained in response to chip boundaries between bits of a first state minus a sum of samples obtained in response to chip boundaries between bits of a second state.

2. A method as claimed in claim 1, wherein the representation includes a sum of differences between pairs of time-separated samples, said level change comprising a pulse.

3. A method as claimed in claim 1, including the step of applying a curve fitting algorithm to said level change to determine an associated introduced delay.

4. A method as claimed in claim 3, wherein the curve fitting algorithm uses a three-path model.

5. A method of processing first and second corresponding signals having a delay therebetween, at least the first signal being an irregular binary signal having chip boundaries, the method comprising:
   sampling the second signal to obtain a plurality of values for each of a plurality of different predetermined delay times relative to a respective chip boundary which lies between bits of the first signal which transit different states and/or have the same state, the plurality of different predetermined delay times differing from each other by less than an interval between chip boundaries; and
   summing samples of the second signal which are obtained substantially at each of the plurality of different predetermined delay times relative to the respective chip boundary to obtain a representation of how the plurality of values vary according to the plurality of different predetermined delay times. which contains a level change associated with a delay time which bears a predetermined relationship to the delay between the first and second signals, wherein
   the samples are obtained in response to chip boundaries between bits of the same state and in response to chip boundaries between bits of different states, and
   the representation includes a sum of samples obtained in response to chip boundaries between bits of a first state and in response to chip boundaries where there are state transitions of a first type, minus a sum of samples obtained in response to chip boundaries between bits of a second state and in response to chip boundaries where there are state transitions of a second type.

6. An apparatus for processing first and second corresponding signals having a delay therebetween, at least the first signal being an irregular binary signal having chip boundaries, the apparatus comprising:
   a sampling unit programmed to sample the second signal to obtain a plurality of values for each of a plurality of different predetermined delay times relative to a respective chip boundary which lies between bits of the first signal which transit different states and/or have the same state, the plurality of different predetermined delay times differing from each other by less than an interval between chip boundaries; and
   a summing unit programmed to sum samples of the second signal which are obtained substantially at each of the plurality of different predetermined delay times relative to the respective chip boundary to obtain a representation of how the plurality of values vary according to the plurality of different predetermined delay times, which contains a level change associated with a delay time which bears a predetermined relationship to the delay between the first and second signals. wherein
   the samples are obtained only in response to chip boundaries between bits of the same state, and
   the representation includes a sum of samples obtained in response to chip boundaries between bits of a first state minus a sum of samples obtained in response to chip boundaries between bits of a second state.

7. A time-delay measurement apparatus including the apparatus according to claim 6, and a providing unit programmed to provide a signal representing the delay between the first and second signals responsive to said level change.

8. A radio receiver having a local PRN code generator and the time-delay measurement apparatus as claimed in claim 7, which measures a time delay between code generated by the code generator and a code obtained from a received radio signal.

9. A radio receiver as claimed in claim 8, wherein the radio receiver is a GPS receiver having multiple channels and the time-delay measurement apparatus measures a time-delay in each channel between a locally generated PRN code and a code obtained from a signal from a respective satellite.

* * * * *